Feb. 21, 1967   A. MILLER   3,305,292
LIGHT DEFLECTING DEVICE
Filed March 15, 1963
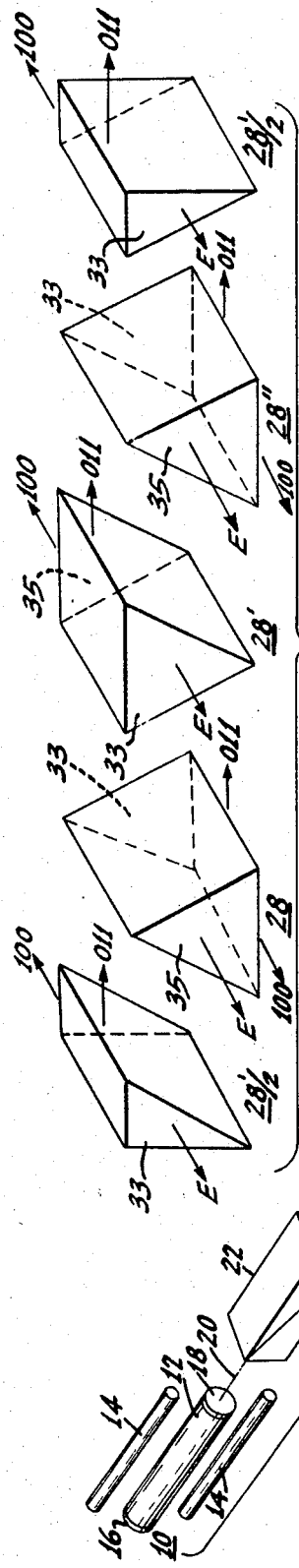
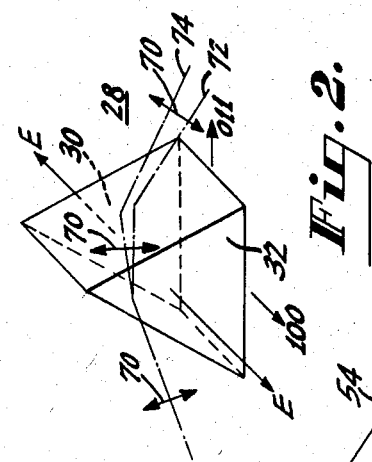
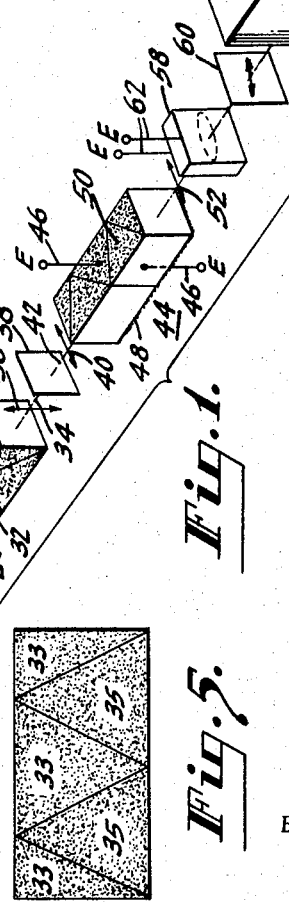
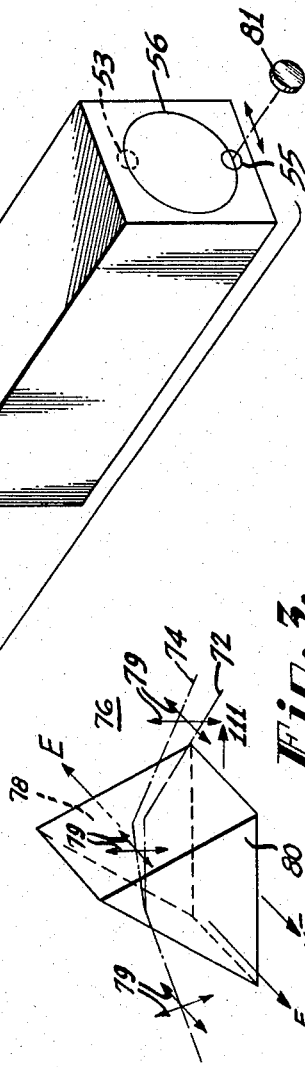
INVENTOR.
ARTHUR MILLER
BY
ATTORNEY United States Patent Office 3,305,292
Patented Feb. 21, 1967

3,305,292
LIGHT DEFLECTING DEVICE
Arthur Miller, Penn's Neck, N.J., assignor to Radio Corporation of America, a corporation of Delaware
Filed Mar. 15, 1963, Ser. No. 265,379
4 Claims. (Cl. 350—150)

This invention relates to an improved light apparatus or system. In particular, this invention relates to an improved method of and means for spatially deflecting a light beam. This device is especially useful for the deflection of a well collimated light beam, one example of which is a laser beam.

The term laser is a name used to refer to a device which provides "light amplification by stimulated emission of radiation." The laser device is commonly used as a well-collimated source of coherent light.

It has been suggested that a collimated light beam, such as that obtained from a laser could be used for many things if the beam could be spatially deflected. For example, the light beam could be modulated and used as a projection television display device if it could be efficiently deflected. Also, the laser beam could be used for steerable optical transmitting and receiving antennas which are desirable in certain types of optical radar. Still further, by diverting the coherent light beam from behind a suitable mask, an efficient amplitude modulator for the light beam could be constructed.

Prior mechanical systems for spatially deflecting a light beam have been limited to relatively low deflection frequencies due to the inertia of the necessary mechanical movement.

It is therefore an object of this invention to provide new and improved means for spatially deflecting a light beam.

It is another object of this invention to provide a novel means, free of any mechanically moving parts, for deflecting a light beam.

A further object is to provide improved methods of and means for electrically deflecting a light beam at high deflection rates.

These and other objects are accomplished in accordance with this invention by providing a collimated source of polarized light having an electro-optic, or magneto-optic, prism positioned in the path of the polarized light. The prism is made of a material which has an index of refraction that can be controlled by the application of an applied field. Thus, the light passing out of the prism will have its direction modulated, by several seconds of arc in response to the field applied to the prism. The deflected light is passed through a half wave length plate to rotate its polarization direction by 90° and then through a second deflection type prism to obtain deflection in a direction perpendicular to the first deflection. The light beam is then directed through a biaxial crystal, with its wave normal nearly coincident with the optic axis of the crystal. The biaxial crystal is selected to have the property of internal conical refraction and, because the wave normal is nearly coincident, but not quite, with one of the optic axes of the biaxial crystal, the ray direction of the beam is further diverted along its deflected path. By using combinations of the two deflection prisms, the beam may be deflected to any position around the optic axis of the biaxial crystal. After passing through the biaxial crystal, the several seconds of an arc deflection is magnified to several degrees of arc depending upon the biaxial crystal material. Due to the birefringence of the biaxial crystal, two differently polarized spots of light oppositely disposed on the theoretical circle of conical refraction emerge from the biaxial crystal for any deflection from the optic axis. These light spots may be rotated around an imaginary circle on the end of the biaxial crystal by modulating the deflection prisms. Should it be desirable to eliminate one of the two light spots, an electro-optically activated polarization rotator may be inserted before the biaxial crystal to impart maximum intensity to one of the spots and minimum intensity to the other. When it is desired to amplitude modulate the light beam, an opaque shield is positioned in the path of the undeflected light beam. Then, when a field is applied to at least one of the prisms, the light beam will be deflected from behind the mask to produce an output signal light in proportion to the signal applied to the prisms.

The invention will be described in greater detail by reference to the accompanying drawings wherein:

FIG. 1 is a partially schematic perspective view of a light deflection system embodying the invention;

FIG. 2 is a perspective view of an embodiment of a light deflection prism of the system of FIG. 1;

FIG. 3 is a perspective view of another light deflection prism which may be used in the arrangement of FIG. 1;

FIG. 4 is an exploded view of a plurality of deflection prisms which may be used in the embodiment of FIG. 1; and, FIG. 5 is an assembled end view of the plurality of prisms shown in FIG. 4, and comprising an element of the system shown in FIG. 1.

FIG. 1 shows a laser device 10 for producing coherent light radiation. The laser 10 is an example of a source of well collimated light and other such sources may be used with this invention. The laser 10 generally comprises an active laser material 12, a pumping source 14 and a pair of optical reflecting surfaces 16 and 18. The reflecting surfaces 16 and 18 form the opposite ends of an optical resonant cavity.

The active material 12 may comprise any known substance which has two energy levels that are separated by an amount corresponding to a characteristic transition emission frequency. The active material 12 has the property of being excitable into an inverted population density condition. In other words, the active material 12 is capable of having an excess population provided in one of the upper energy levels as compared to a lower energy level. The active material 12 emits coherent radiation as the atomic particles return from the upper energy level to the lower energy level. The active material may comprise a solid, such as calcium fluoride doped with divalent dysprosium, or gallium arsenide, or a gas such as a helium-neon mixture.

The active laser material 12 is positioned in a resonant cavity formed by light reflecting surfaces 16 and 18. The light reflecting surfaces 16 and 18 are precisely oriented so that one or more resonant modes will exist between the light reflecting surfaces at frequencies for which the spacing therebetween is an integral number of half wavelengths. At least a portion of the one light reflecting surface 18 is partially transparent so that a coherent light output beam 20 may be obtained from the laser device 10. The light reflecting surfaces 16 and 18 may comprise any known light reflecting surface such as a layer of aluminum or an interference type reflecting body. Also, the light reflecting surface may comprise the interface between the active body 12 and air. For example, if a gallium arsenide active material is used, the difference in indices of refraction between the gallium arsenide and air is sufficient to effectively provide a resonant cavity within the gallium arsenide body.

The pumping source 14 may comprise any known source of energy which is capable of exciting the atomic particles in the active laser material 12 from a lower energy level into one of the higher energy levels. In other words, the pumping source 14 is a source of energy for establishing the inverted population density condition. Examples of such pumping sources are a radio frequency field, a xenon flash tube, or a pulse generator. The gallium arsenide type laser may be electrically pumped while the other types of lasers are optically pumped.

During operation, the laser device 10 produces a well collimated, unmodulated beam 20 of coherent light. In general, the beam 20 will be polarized. However, to insure that the beam 20 is in the plane polarized condition, a polarizer 22 is positioned in the path of the beam 20. Plane polarizers are well known in the art and the polarizer 22 may be of any known type such as a Glan-Thompson prism. The light 24 emerging from the polarizer 22 is plane polarized light having its electric vector polarized in the direction illustrated by arrow 26.

The plane polarized light beam 24 is then passed through a light deflecting means including a plurality of prisms 28. Light deflecting prisms, such as electro-optic and magneto-optic prisms, are prisms made of a material that is substantially transparent to light of the wavelength under consideration, i.e. light produced by the laser 10. Also, the material used as the prism is a material which will change its index of refraction in response to an electric or magnetic field. The deflection type prism, particularly the electro-optic deflection type, will be described in greater detail in connection with FIGS. 2 through 5. The prism 28 of FIG. 1, is an electro-optic prism and is energized by a pair of electrodes 30 and 32 applied to opposite side faces of the prism. By applying potentials to the electrodes 30 and 32, the direction of the light beam 24 is altered, or deflected, as it emerges from the plurality of prisms 28 in response to the electric field. With reasonable electric fields, e.g. about 1,000 volts/cm., the amount of deflection that is obtained from the prisms 28 is several seconds of an arc.

At emergence from the prisms 28, the electric vector of the polarized beam 34 is in the direction illustrated by the arrow 36, and the deflection is in the direction of up and down as illustrated on the drawing.

The deflected light beam 34 is passed through a half wave plate 38 to rotate by 90° the plane of polarization of the beam 34 so that the light beam is now horizontally polarized as illustrated by arrows 40.

The light beam 42 is then passed through a second set of electro-optic, or magneto-optic, light deflecting prisms 44 that are connected to a second source of potential 46. The electro-optic prisms 44 may be similar to the prisms 28 and will be described in detail in connection with FIGS. 2 through 5. As the light beam passes through the electro-optic prisms 44, with potentials applied to the end electrodes 48 and 50, the direction of the light beam 42 is again deflected but in a direction perpendicular to the deflection provided by the prisms 28. Thus, the prisms 28 and 44 function together to provide deflection of the coherent light beam 52 in two directions. The deflection obtained, by the application of potentials to prisms 28 and 44, is several seconds of an arc.

By passing the deflected light beam 52 through a biaxial crystal 54, in a direction close to, but not on, e.g. about 5 to 10 seconds of an arc removed from, one of the optic axes of the biaxial crystal, the several seconds of an arc deflection can be magnified to a deflection of several degrees of an arc. The biaxial crystal 54 is a crystal having the property of internal conical refraction. Born, M., and Wolf, E., in "Principles of Optics," Pergamon Press, New York, 1959, p. 685f, describes internal conical refraction and the phenomena which occur when the conditions for internal conical refraction are nearly fulfilled.

In general, if a light beam, having a small cross section, enters a biaxial crystal, with an angular distribution which envelops the optic axis of the crystal, then the light beam will produce two concentric and enlarged circles of light on the opposite end of the crystal. The diameter of the circles will be determined by the material and length of the biaxial crystal. If this same beam is moved slightly to one side of the optic axis, then two light spots will be produced on the opposite end of the crystal and the circles will disappear. One of the light spots will be polarized in one direction, e.g. horizontally polarized, and will be spaced just outside of the region of the circle, while the other light spot will be oppositely polarized and spaced just inside the circle region and 180° removed from the first spot. Precession of the direction of the wave normal around the optic axis will move the spots around the circle.

The light beam 52 is made to enter a biaxial crystal in such a way that in its undeflected condition, its wave normal is substantially coincident with one of the optic axes of the crystal 54. Then, when the beam is deflected by either of the prisms 28 or 44, the light output from the crystal 54 will be two dots 53 and 55 of light which trace an imaginary circle 56 on the end of the biaxial crystal 54 when the wave normal of the input light 52 is precessed around the optic axis. The amount of deflection that is obtained from the biaxial crystal 54 will depend primarily upon the material selected to be used as the crystal 54. Known materials exhibiting the property of internal conical refraction, and their deflection angles, are aragonite 1°30′, sulfur 7°, and naphthalene or anthracene 13° to 15°. Any of the known materials exhibiting the desired property may be used as a biaxial crystal 54.

A specific example of a biaxial crystal 54 is a prism of sulfur, having a cross sectional dimension of about twice the cross section of the incident beam and about ten times as long as the cross sectional dimension.

During operation of the light deflector described to this point, two moving spots of light will be produced, one spaced slightly inside and the other slightly outside of the imaginary circle 56. Should it be desirable to eliminate one of these light spots, which will usually be preferred, an electro-optic polarization rotator 58 may be placed in the light path, along with a quarter wave length plate 60. The electro-optic polarization rotator 58 may comprise any of the known polarization rotators such as a crystal of potassium dihydrogen phosphate having a pair of electrodes 62 connected thereto. By applying potentials to the polarization rotator 58, maximum intensity is imparted to one of the two deflected rays and zero intensity to the other. Quarter wave length plates are well known in the art and any conventional plate, one example of which is mica, may be used for the plate 60.

Thus, the invention described is a method of and means for, deflecting a coherent light beam. By proper selection of materials and potentials, the beam may be deflected through an angle of as much as 15° with reasonable potentials applied to the deflection prisms.

FIG. 2 shows a single deflection prism. The deflection prism 28 is shown as being an electro-optic prism having electrodes 30 and 32 on opposite ends, rather than any of the prismatic faces. It should be understood that deflection prisms may also be controlled by other means, such as a magnetic field and, when an electro-optic prism is used, other methods may be used to apply the electric field. The prism 28 is made of an insulating material that is substantially transparent to the wavelengths of light which are to be transmitted therethrough. The prism 28 may be approximately 1 cm. on a side. The prism is cut and polished so that the 011 and 100 crystallographic axes, and the direction, E, of the applied field are positioned substantially as shown in the drawings.

The potential difference is applied to the prism by means of electrodes 30 and 32 which may be made of a material such as gold. The potential difference is applied substantially along the direction indicated by E. The crystal 28 may be made of any material belonging to the crystallographic classes T (class 23), or class $T_d$ (class $\bar{4}3m$). An example of these materials is cuprous chloride. Details of these crystallographic classes are described in an article entitled, "Optical Properties and the Electro-optic and Photo-elastic Effects in Crystals Expressed in Tensor Form," by W. P. Mason, appearing in The Bell System Technical Journal, vol. XXIX, pages 161–188, published April 1950.

In the embodiment shown in FIG. 2 the light is vertically polarized as represented by arrows 70. When a potential of approximately 1,000 volts per cm. is applied between the electrodes, the light beam is deflected from the path illustrated by the line 72 to path illustrated by the line 74. It should be understood that lines 72 and 74 are illustrated as being substantially spaced apart, for ease of illustration, and the deflection obtained, with this order of magnitude of voltage, will be of the order of several seconds of an arc.

FIG. 3 shows a deflecting prism 76 made of the same material as previously described. This deflection prism is cut so that the 11$\bar{2}$ and 111 crystallographic axis, and the direction, E, of the applied field are in the position illustrated. Electrodes 78 and 80 are positioned on the ends of the prisms as shown. The prism 76 has the advantage over the prism 28 in that the polarization direction of the light passing through the prism 76 may be either horizontal or vertical as represented by lines 79. Thus, when the embodiment of a deflection prism shown in FIG. 3 is used in the deflection system shown in FIG. 1, the half wavelength plate 38 may be eliminated from the deflection systems. However, the power required to obtain the same amount of deflection from the deflection prism 76 will be approximately fifty percent greater than that required by the embodiment shown in FIG. 2.

FIG. 4 shows a plurality, three and two halves are shown, of deflecting prisms 28, 28', 28" and 28'/2. The alternate prisms 28 and 28" are oriented alike and the intermediate prisms 28' etc. are inverted and turned end for end with respect to the alternate prism 28 and 28". Thus the ends 33 and 35 of the prisms are as shown. The plurality of prisms are then positioned in abutting relationship as shown in FIG. 5. They may be cemented to prevent loss by reflection or refraction between air and crystal. The half prisms 28'/2 are used so that a straight-through optical system may be obtained. The multiple deflection prism arrangement of FIGS. 1, 4 and 5 permits a decrease in the power requirements to obtain the same amount of deflection as can be obtained with the example of FIG. 2. For example, if 1,000 volts/cm. were used to deflect the beam in the single prism of FIG. 2 for a predetermined deflection, the use of 250 volts/cm. on the embodiment of FIGS. 4 and 5 would produce the same deflection. When the prisms are assembled as shown in FIG. 5, continuous electrodes 30 and 32 are applied to the opposite ends thereof.

Any of the deflection prisms may be cut and polished by conventional optical processing methods using devices that are known in the art. Although the deflecting prisms have been shown as electro-optic devices it should be understood that other systems, e.g. magneto-optic systems, for controllably changing the index of refraction of the prisms, and therefore deflecting the light beam, may be used.

Thus, this invention has described a novel method of and means for controllably deflecting a light beam. By positioning a mask 81 at the undeflected position of the light beam on the biaxial crystal 54, FIG. 1, this deflection may be used to amplitude modulate the light beam. When this is done, signals may be applied to electrodes 30 and 32 or electrodes 48 and 50, or both.

Also, by using what is essentially two cascaded systems of the type shown in FIG. 1, the light beam may be scanned over either a circular or a rectangular raster, depending upon the potentials applied to the deflecting prisms in the invention. When this is done, one pair of deflecting prisms provides the precessing of the two light spots around the imaginary circle as has been described. The second pair of deflecting prisms also provides precessing around a second imaginary circle on a second biaxial crystal with the second imaginary circle having a common point with the position of the light spot on the first imaginary circle. Thus, by proper selection of the applied potentials, any desired deflection may be obtained.

What is claimed is:
1. In combination, field-responsive light-deflecting means for deflecting a collimated beam of light transported therethrough by a first relatively small amount which is in accordance with the value of a field applied thereto with respect to a datum value of said field, means for applying a collimated beam of light as an input to said field-responsive light deflecting means, means for applying said field to said field-responsive light deflecting means, whereby the location of the collimated beam of light emerging as an output from said field-responsive light deflecting means is determined by the value of said applied field, and a biaxial optical crystal in the path of said collimated beam of light emerging as an output from said field-responsive light deflecting means for transporting said output beam of light therethrough, said biaxial optical crystal being oriented with one of its optical axes substantially parallel to said output beam of light transported therethrough only when said field has said datum value, whereby light emerging from said biaxial optical crystal in response to said field having a value other than said datum value is deflected by a second relatively large amount which is a substantial magnification of said first amount.

2. The combination defined in claim 1, wherein said field-responsive light deflecting means comprises an electro-optic crystal and said field is an electric field.

3. The combination defined in claim 1, wherein said field-responsive light deflecting means comprises respectively first and second cascaded electro-optic crystal means, said first electro-optic crystal means being disposed to cooperate with a first electric field applied thereto for deflecting said light in a given first linear direction, said second electro-optic crystal means being disposed to cooperate with a second electric field applied thereto for deflecting said light in a second linear direction orthogonal to said first linear direction.

4. The combination defined in claim 1, wherein said field-responsive light deflecting means comprises an electro-optic crystal means composed of a plurality of separate electro-optic triangular prisms of the same electro-optic material, said triangular prisms being cut and arranged to fit serially together to form a longitudinal rectangular parallelepiped, all of said prisms being cut and arranged with their respective "011" crystallographic directions pointing in the same direction parallel to the length of said parallelepiped, a first group of said prisms comprising alternate ones thereof being cut and arranged with their respective "100" crystallographic directions pointing in the same given direction perpendicular to the length of said parallelepiped, a second group of said prisms comprising the remaining ones thereof being cut and arranged with their respective "100" crystallographic directions pointing opposite to said given direction, wherein said means for applying said field comprises means for applying an electric field to both said first and second groups of prisms in said given direction, and wherein said means for applying a collimated beam of light comprises means for applying said beam in a direction parallel to the length of said parallelepiped with the electric vector of said light polarized in a direction orthogonal to said electric field.

References Cited by the Examiner

UNITED STATES PATENTS

| | | | |
|---|---|---|---|
| 1,923,891 | 8/1933 | Skaupy | 88—61 |
| 2,780,958 | 2/1957 | Wiley | 88—61 |
| 3,040,625 | 6/1962 | Zito | 88—61 |

FOREIGN PATENTS 675,357  7/1952  Great Britain.

(Other references on following page)

OTHER REFERENCES

Marechal, A.: Optical Filtering by Double Diffraction, In Optical Processing Information, ed. by Pollack et al., Baltimore, Spartan Books, Inc., 1963, pp. 20–30.

"Optical Techniques Can Raise Computer Speed," Electronics, vol. 35, No. 45, November 9, 1962, pp. 30–32.

Schmidt, U.: The Problem of Light Beam Deflection at High Frequencies, In Optical Processing of Information, ed. by Pollack et al., Baltimore, Spartan Books, Inc., 1963, pp. 98–103.

JEWELL H. PEDERSEN, *Primary Examiner.*

RONALD L. WIBERT, *Examiner.*

E. S. BAUER, *Assistant Examiner.*